(12) United States Patent
Kearney et al.

(10) Patent No.: US 8,741,146 B2
(45) Date of Patent: Jun. 3, 2014

(54) METHOD FOR THE RECOVERY OF ACIDS FROM HYDROMETALLURGY PROCESS SOLUTIONS

(75) Inventors: Michael M. Kearney, Twin Falls, ID (US); Michael W. Mumm, Kimberly, ID (US); Lawrence Velasquez, Twin Falls, ID (US); William Jacob, IV, Jerome, ID (US)

(73) Assignee: Amalgamated Research LLC, Twin Falls, ID (US)

( * ) Notice: Subject to any disclaimer, the term of this patent is extended or adjusted under 35 U.S.C. 154(b) by 100 days.

(21) Appl. No.: 13/407,519

(22) Filed: Feb. 28, 2012

(65) Prior Publication Data

US 2012/0160772 A1 Jun. 28, 2012

Related U.S. Application Data

(63) Continuation of application No. 11/999,979, filed on Dec. 6, 2007, now abandoned, which is a continuation of application No. 10/888,141, filed on Jul. 9, 2004, now abandoned.

(60) Provisional application No. 60/487,767, filed on Jul. 16, 2003.

(51) Int. Cl.
*B01D 15/08* (2006.01)

(52) U.S. Cl.
USPC ........... 210/635; 210/656; 210/659; 210/684; 210/198.2

(58) Field of Classification Search
USPC ......... 210/635, 656, 659, 662, 663, 664, 669, 210/670, 676, 683, 684, 198.2
See application file for complete search history.

(56) References Cited

U.S. PATENT DOCUMENTS

| | | | |
|---|---|---|---|
| 2,985,589 A | 5/1961 | Broughton et al. |
| 3,099,529 A | 7/1963 | Hatch et al. |
| 4,182,633 A | 1/1980 | Ishikawa et al. |
| 4,332,623 A | 6/1982 | Ando et al. |
| 4,412,866 A | 11/1983 | Schoenrock et al. |
| 4,990,259 A | 2/1991 | Kearney et al. |
| 5,064,539 A | 11/1991 | Tanimura et al. |
| 5,102,553 A | 4/1992 | Kearney et al. |
| 5,127,957 A | 7/1992 | Heikkila et al. |
| 5,171,548 A | 12/1992 | Rossiter et al. |
| 5,246,591 A | 9/1993 | Abolt et al. |
| 5,626,762 A | 5/1997 | Priegnitz |
| 5,795,398 A | 8/1998 | Hyoky et al. |
| 5,968,362 A | 10/1999 | Russo, Jr. |
| 6,770,757 B2 | 8/2004 | Paananen et al. |
| 7,588,687 B2 | 9/2009 | Davankov et al. |
| 2008/0093302 A1 | 4/2008 | Kearney et al. |

FOREIGN PATENT DOCUMENTS

CA 2528171 12/2011

OTHER PUBLICATIONS

Sheedy, Michael, RECOFLO® Ion Exchange Technology, published in the Proceedings of the TMS Annual Meeting 1998.
Ion Exchange and Solvent Extraction, A Series of Advances, vol. 18, 2007, sections 7.7.4-7.7.5, CRC Press, Taylor & Francis Group, Boca Raton, FL.

*Primary Examiner* — Ernest G Therkorn
(74) *Attorney, Agent, or Firm* — TraskBritt, P.C.

(57) ABSTRACT

A method for the recovery of acids and other materials from hydrometallurgic process solutions comprising processing said solutions utilizing a simulated moving bed chromatographic method to produce at least two product streams.

32 Claims, 2 Drawing Sheets

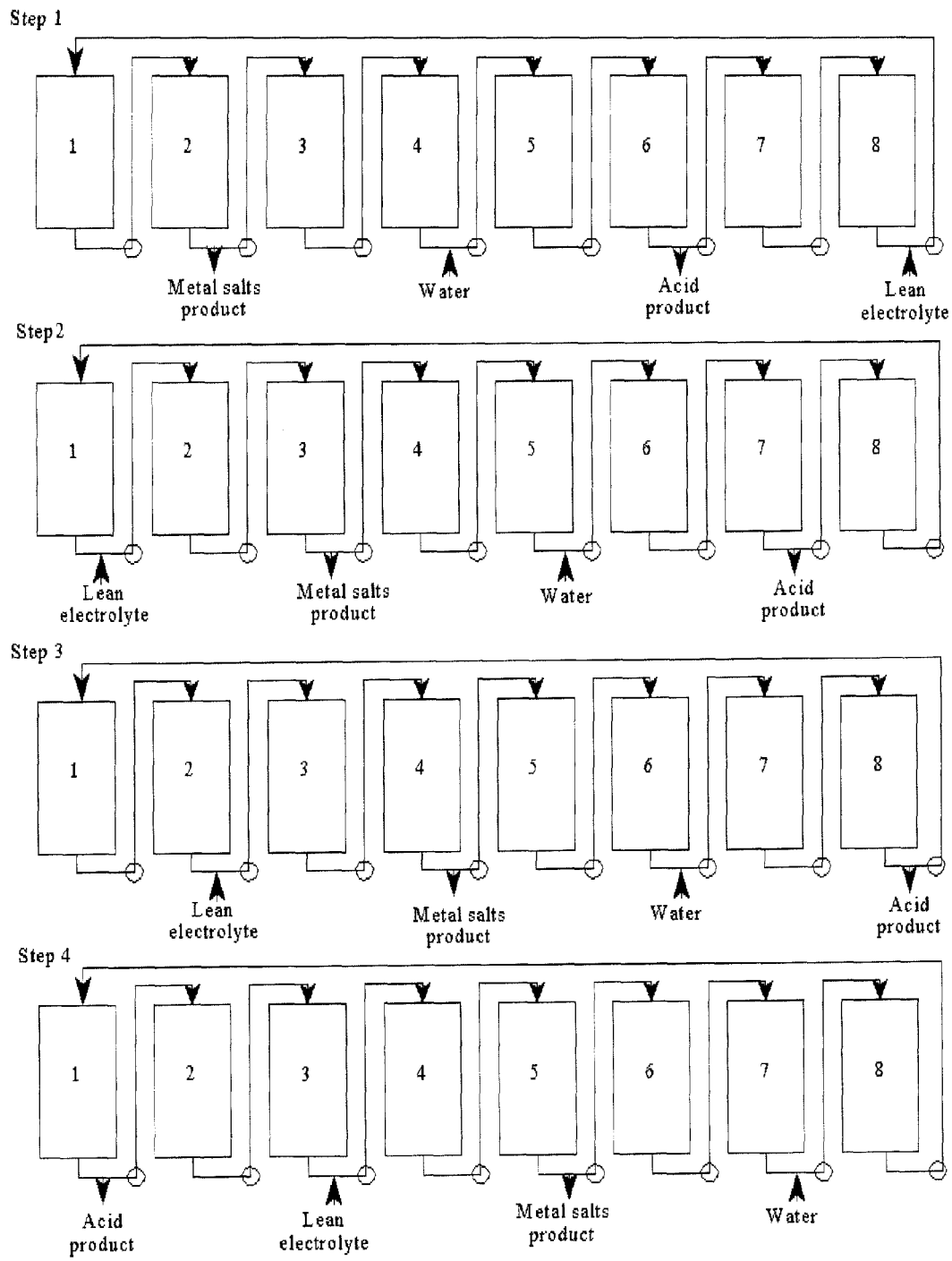
(Continued)

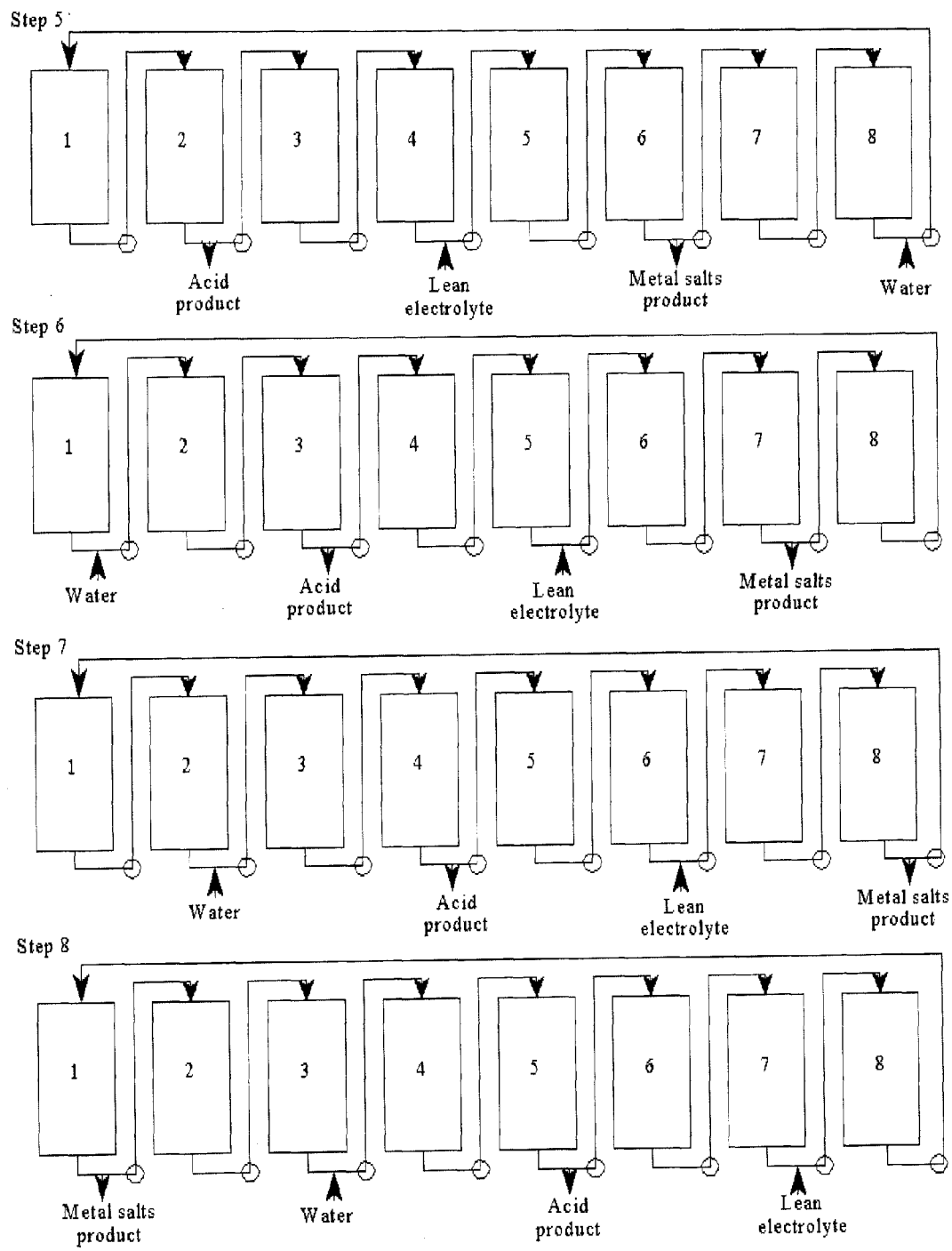

METHOD FOR THE RECOVERY OF ACIDS FROM HYDROMETALLURGY PROCESS SOLUTIONS

CROSS-REFERENCE TO RELATED CASES

This application is a continuation of U.S. patent application Ser. No. 11/999,979, filed Dec. 6, 2007, now abandoned, which is a continuation of U.S. patent application Ser. No. 10/888,141, filed Jul. 9, 2004, now abandoned, which application claims the benefit of U.S. Provisional Application No. 60/487,767, filed Jul. 16, 2003, the disclosures of each of which are hereby incorporated herein by this reference in their entirety.

TECHNICAL FIELD

The invention relates to the separation of acid solutions, such as acid/metal salt solutions used in the field of extractive metallurgy or from other acid/metal salt solution sources.

BACKGROUND

Hydrometallurgy refers to the dissolution of ores using aqueous solutions. Generally, three steps make up the process. These are:
1. The use of an aqueous solution to leach the metal.
2. Removal of impurities from the solution.
3. Recovery of the metal (or its compound) from the solution.

The aqueous solution used for leaching is often an acid solution. These acids can include, but are not limited to, sulfuric acid, nitric acid, hydrochloric acid, acetic acid and phosphoric acid. Such acids and metals in general are certain targets for recovery by the present invention.

As an example of acid use, dilute sulfuric acid is used to leach oxide ores such as zinc oxide. Another example is using recycled sulfuric acid for leaching waste rock and overburden at copper mines.

We have discovered that the use of the present invention provides an efficient method for recovering acid used in hydrometallurgical applications. Industrial benefits include allowing for the recycling of the acid solution where recycling is not normally used, improved efficiency and cost effectiveness of acid recovery, where recovery is already used, and improved efficiency/recovery of metals.

Presently, it is known to those ordinarily skilled in the art to purify and recover acid using acid retardation utilizing batch (fixed bed) chromatography columns or with Higgins loop systems. Acid retardation is a method for selectively extracting strongly dissociated acids from solutions typically using strong-base type anion exchange resins. A feed solution is passed over a strong-base type anion exchange resin. The resin, for instance, has a greater affinity for the acid than for salts, resulting in separation of salts from the acid which has its movement retarded by the resin's affinity. The acid typically is displaced from the resin by a pulse of fresh water.

Acid retardation carried out in fixed bed or column chromatography systems utilize a batch mode with feeding of solution followed by elution with water. The foregoing method is the simplest to configure and understand but is typically the least efficient with respect to resin loading and eluent use. The Eco-Tech Acid Processing Unit (APU) is an example of this type of system.

The Higgins loop is equipment that requires a complicated intermittent pulsing of resin around a closed loop made up of reacting sections. The resin moves in one direction while the liquid moves in the other. Although Higgins loops can be more efficient than batch chromatographic systems, they exhibit a number of problems. In particular, the movement of the resin typically results in resin degradation over time. It is generally noted that many of today's mining methods were introduced as early as the mid-$19^{th}$ century.

SUMMARY OF THE INVENTION

The invention relates to the separation of acid solutions, such as acid/metal salt solutions used in the field of extractive metallurgy or from other acid/metal salt solution sources.

In an exemplary embodiment, the invention provides a method for the recovery of acid and/or metals from an acid and metal salt solution, wherein the method comprising feeding a feed solution comprising an acid and metal salt solution to a simulated moving bed process in a system having one or more columns or beds containing a resin and producing at least a first product stream and a second product stream from the simulated moving bed process, wherein the first product stream comprises a higher concentration of the acid than the second product stream. Examples of acids which may be separated by the method of the invention include, but are not limited to sulfuric acid, hydrochloric acid, nitric acid, acetic acid and phosphoric acid. Examples of a simulated moving bed (SMB) process of the invention include continuous SMB, semi-continuous SMB, time variable SMB, sequential SMB, and/or pulsed SMB.

In an exemplary embodiment, the resin is an anion resin, which may optionally be a weak base anion resin or a strong base anion resin, such as a type I or type II resin.

In another exemplary embodiment, the eluent of the invention may include an aqueous eluent. Examples of aqueous eluents include pure water and/or water having less than 5% dissolved components. Optionally, a feed solution of the invention may be filtered prior to being fed into the simulated moving bed process of the invention.

Optionally, a product stream produced by the method of the invention may be further processed in a separate system using one or more methods selected from the group consisting of chromatography, filtration, membrane treatment, evaporation, distillation, drying, gas absorption, solvent extraction, press extraction, adsorption, ion exchange and/or centrifugation.

In another exemplary embodiment, a product stream may optionally be re-used or recycled, for example, in a process used to produce the feed solution.

In another exemplary embodiment, the metal salts in the simulated moving bed process may optionally be monitored by measuring the conductivity of the metal salt in one or more process streams. In yet another embodiment, the production of at least one process stream may be adjusted so that at least one product stream exhibits a minimum conductivity. For example, the recirculation stream and/or one or more output product streams may be measured for conductivity. Such monitoring of conductivity may optionally be used in adjusting the flow rate of a recirculation stream in the simulated moving bed process.

BRIEF DESCRIPTION OF THE DRAWING

FIG. 1 is an illustration of the configuration of a simulated moving bed utilized for the chromatography in the Example.

DETAILED DESCRIPTION OF THE INVENTION

It has not been known to apply simulated moving bed (SMB) chromatography to purify and/or recover products from aqueous solutions used in hydrometallurgical applications, such as acids used for leaching or other metal/acid streams. In general, it is likely that SMB has not been considered for use in the field due to, e.g., the expected difficulty or inability of applying SMB to a material which involves an acid retardation mechanism (more akin to adsorption) for recovery. We have found, however, that the method of this invention can provide a successful, cost-effective way of recovering valuable materials from metal/acid solutions, such as recovery of acids, and any metal in an acid/metal solution, such as copper. Such metal/acid solutions may be generated as waste from, for example, mining operations or chemical processing. The ability to cost-effectively process such waste streams, for example, will allow recovery of such valuable materials and help obviate the environmental problem of materials such as mining waste.

The general capability of the invention to separate the components of acid/metal mixtures provides a solution to other related industrial problems. For example, the invention may be used to separate acid and any metal from an acid solutions used to clean metals or for separation of acid/metal mixtures resulting from chemical processing.

The present invention is used to recover certain acid material from hydrometallurgical process streams, or other metal/acid streams using acid retardation by utilizing chromatographic simulated moving bed (SMB) technology. We have now discovered that applying the method of this invention eliminates the long observed, well known problems of acid recovery in the hydrometallurgical industry such as poor eluent efficiencies, poor loading and resin degradation, typically encountered by use of Higgins loop processing or batch chromatographic systems in processing hydrometallurgical process streams, or other metal/acid streams. Anion resin is typically the preferred separation media used. These resins may be referred to as strong and weak base ion exchangers. Further, strong base type ion exchangers are typically described as type I or type II ion exchangers. Type I typically contain a trimethylamine group and type II typically contain a dimethyl-beta-hydroxyethylamine group. A variety of anion resins are known in the art and may be used in the invention.

In SMB chromatography, instead of moving the separation medium or bed, e.g., a resin bed, to obtain a fixed internal separation profile, the bed is held in place, and the movement of the bed is simulated. The profile is moved by a liquid recirculation flow, and the system inlets and outlets are moved to keep up with the profile. In practice, an SMB system can take the form of either a single column with some kind of distributor-collector at regular intervals through the bed or multiple columns with inlet and outlet ports before each column. In both cases, liquid from the bottom or final column is recirculated to the top or first column, and the system operates as a loop with separation occurring as a component profile is recirculated through the whole system. A simulated moving bed having a single bed or column is divided into multiple separating sections by the distributor-collectors. In either the single bed or multiple bed configuration, the system forms a loop and circulating liquid moves in sequence through the separating sections while process input streams (including a feed stream and/or an eluent) are cyclically introduced in corresponding sequence to the loop at selected locations associated with the separating sections, and compensating product output streams are withdrawn in similarly corresponding sequence from the loop at other selected locations associated with the separating sections, all while maintaining a forward flow in a fixed direction through the loop during the process (for example, see, FIG. 1, wherein the steps illustrate the corresponding sequence of input streams and output product streams).

SMB technology in general is applicable for use in this invention. Examples include SMB methods wherein the internal recirculation is never halted and where each step is identical in function except for movement of valve locations around the loop (examples are U.S. Pat. No. 2,985,589, U.S. Pat. No. 4,182,633 and U.S. Pat. No. 4,412,866), and types wherein flow rates may follow time variable functions or steps are not identical with respect to function (examples are U.S. Pat. No. 4,332,623, U.S. Pat. No. 5,064,539, and U.S. Pat. No. 5,102,553). SMB methods may also include semi-continuous and sequential types such as generally described in U.S. Pat. No. 5,127,957.

In a preferred embodiment of this invention, a solution containing the acid/metal salts is fed to a simulated moving bed which is filled with anion resin. Examples of anion resin are Dowex XUR-1525, MSA-1; Mitsubishi PA306S, MA01SS, MA03SS, Bayer M500 and/or Bayer M600. The number of columns or beds preferably is 1 to 8. Preferably, a column comprises one or several separating sections (beds) containing chromatographic media, for example, resin. Those feed tanks, filters, piping connecting flow between columns, beds and/or separating sections where so connected, pumps, valving, pressure regulators, metering equipment, flow control and microprocessor equipment utilized in a preferred embodiment are well known in construction and function to those skilled in the art.

Preferably, the operating steps, for example, of an 8 column system, are as shown in FIG. 1. These steps preferably are managed by a microprocessor which controls the appropriate valve opening/closing, flow rates, and pressures. Those skilled in the art after reading this disclosure will appreciate multiple alternative arrangements of such steps to optimize the disclosed process for particular needs and feedstock materials.

The preferred eluent for the SMB in this application may consist of water or a stream which is primarily water (i.e., an aqueous eluent). Other eluents known to those in the art are also contemplated herein. For example, if pure water is not available, a waste stream or material of less than pure quality may be used. Preferably, such an eluent should typically contain less than 5% dissolved contaminants on weight (such as acid or metal salts). Such contaminants will tend to also contaminate the products of the SMB chromatography; accordingly, it is preferred that such contaminants be minimized in the eluent.

Preferably the feed solution should be filtered as required prior to use in the SMB system. Doing so will help avoid accumulation of suspended solids in the resin beds of the separator.

Depending on the configuration of the chromatographic separator, any number of product streams may be obtained. Usually, however, two streams are taken from the separator. Preferably, optimization of the process can be accomplished by monitoring the conductivity profile of the metal salts phase and adjusting the phase to exhibit a minimum conductivity profile. Preferably, optimization is done by measuring the conductivity of the metal salts phase either from the exiting (output) product stream or in the recirculation internal to the system and increasing or decreasing the recirculation rates.

If desired, this invention can be configured as a succession of chromatographic or other separations. For example, the product from an initial SMB operating in the manner of this invention can be used as a feed solution to a subsequent SMB or batch chromatographic operation, or combination. In addition, the product output stream may be further processed by one or more of the following methods: chromatography, filtration, membrane treatment, evaporation, distillation, drying, gas absorption, solvent extraction, press extraction, adsorption, ion exchange and centrifugation. This type of successive separation with this invention can provide additional product quality, although it may require certain additional capital cost for additional chromatographic equipment. If further chromatography is utilized, it may also be necessary to concentrate the product solutions before entering the subsequent chromatography step(s), preferably by evaporation, although other means of removing eluent may be utilized.

Preferably, the method for recovery of acid and/or metals from an acid/metal salt solution includes feeding the acid/metal solution to a simulated moving bed containing anion resin and eluting with a water solution. The feed solution may contain or be derived from one or more of the following acids: sulfuric acid, hydrochloric acid, nitric acid, acetic acid, and/or phosphoric acid. The simulated moving bed type may be chosen from the group of continuous SMB, time variable SMB, sequential SMB, etc. Preferably, the water eluent utilized contains less than 5% dissolved components, and the feed solution is filtered to remove suspended solids prior to feeding to the SMB system.

Preferably, the separator internal profile is controlled by monitoring the conductivity of the metal salts phase. The conductivity of the metal salts phase may be monitored in the exiting metal salts product stream or in the recirculating metal salts phase. The conductivity control may involve adjusting the internal recirculation rate so that the conductivity profile of the metal salts phase exhibits a minimum conductivity profile.

The following example is given to illustrate the present invention. This Example is given for illustrative purposes, and the invention embodied therein should not be limited thereto.

EXAMPLE OF INVENTION

A solution containing sulfuric acid, dissolved copper and iron was treated by this invention. A pilot plant SMB apparatus was utilized. The materials of construction were resistant to the particular acid(s) and metals being recovered. In this Example the preferred materials were Teflon, polypropylene, PVC and Hastalloy C.

The simulated moving bed was configured as in FIG. 1. The SMB system was operated using continuous internal recirculation. The SMB columns were filled with Dowex XUR-1525 which is a strong base anion resin. The feed composition is indicated on table 1 and was loaded at 85 lbs. dissolved solids per cubic foot resin/day. Total resin volume for the test was 1.18 cubic feet distributed equally among the 8 columns. Other parameters are in Table 1.

TABLE 1

| Operating Parameters | |
| --- | --- |
| Step time | 14 minutes |
| Eluent | water (at a ratio of 1.5 water to 1.0 feed on a volume to volume ratio) |
| Operating temperature | 30 Centigrade |
| Product ratio | 1.0 (ratio of acid product collected to metal salts collected on a volume to volume ratio) |

TABLE 2

Results: Concentrations of components in each stream

| Component | Feed | Eluent (water) | Acid Product | Metal Salts Product |
| --- | --- | --- | --- | --- |
| $H_2SO_4$ g/l | 244.2 | 0 | 133.0 | 64.2 |
| Cu g/l | 35.2 | 0 | 2.7 | 26.0 |
| Fe g/l | 1.6 | 0 | .2 | 1.2 |

TABLE 3

Results: Material balance % recovery of each component

| Component | Feed | Eluent (water) | Acid Product | Metal Salts Product |
| --- | --- | --- | --- | --- |
| $H_2SO_4$ % recovery | 100 | 0 | 73.0 | 27.0 |
| Cu % recovery | 100 | 0 | 11.9 | 88.1 |
| Fe % recovery | 100 | 0 | 19.0 | 81.0 |

The results from this Example demonstrate a successful recovery of acids and metals with over 70% recovery of each feed component. Note that the anion associated with iron and copper in this particular Example is sulfate.

The results demonstrate successful separation of an acid solution, and were surprising, e.g., given that the method involved an acid retardation and metals separation in an SMB system. In comparison, for example, the batch use of acid retardation involves passing the solution for a period of time down, through the batch cell containing the resin, then stopping and sending water in the opposite direction through the same resin, upwards, to wash off the acid. In this respect, the batch method involves an operation more akin to adsorption, the acid is held by the resin and is subsequently rinsed off, than typical chromatography. The present Example, utilizing an SMB method and a continuous phase of circulating water, thus, demonstrated that a continuous phase can be successful for an adsorption-like separation.

While the above invention has been described with reference to certain preferred embodiments, the scope of the present invention is not limited to these embodiments. One skilled in the art may find variations of these preferred embodiments which may, nevertheless, fall within the scope of the present invention, whose scope is defined by the claims set forth below.

What is claimed is:

1. A method for recovering acid and/or metals from an acid and metal salt solution, the method comprising:
   feeding a feed solution comprising an acid and metal salt solution to a simulated moving bed in a system comprising one or more columns or beds containing a resin;
   feeding an aqueous eluent to the simulated moving bed; and
   removing at least a first product stream and a second product stream from the simulated moving bed, wherein the first product stream comprises a higher concentration of the acid than the second product stream.

2. The method according to claim 1, wherein the feed solution comprises one or more acids selected from the group consisting of sulfuric acid, hydrochloric acid, nitric acid, acetic acid and phosphoric acid.

3. The method according to claim 1, wherein the simulated moving bed (SMB) is selected from the group consisting of continuous SMB, semi-continuous SMB, time variable SMB, sequential SMB, and pulsed SMB.

4. The method according to claim 1, wherein feeding a feed solution comprising an acid and metal salt solution to a simulated moving bed and feeding an aqueous eluent to the simulated moving bed comprises cyclically introducing the feed solution and the aqueous eluent to the simulated moving bed.

5. The method according to claim 4, wherein the eluent comprises less than 5% dissolved components.

6. The method according to claim 1, wherein the feed solution is filtered prior to feeding to the simulated moving bed.

7. The method according to claim 1, comprising utilizing an anion resin in the simulated moving bed.

8. The method according to claim 7, wherein the anion resin is a weak base anion resin.

9. The method according to claim 7, wherein the anion resin is a strong base anion resin.

10. The method according to claim 9, wherein the anion resin is a type I anion resin.

11. The method according to claim 9, wherein the anion resin is a type II anion resin.

12. The method according to claim 1, wherein at least one of the product streams is subjected to further processing in a separate system by one or more methods selected from the group consisting of chromatography, filtration, membrane treatment, evaporation, distillation, drying, gas absorption, solvent extraction, press extraction, adsorption, ion exchange and centrifugation.

13. The method according to claim 1, further comprising recycling at least one of the at least a first product stream and a second product stream for re-use in a process producing the feed solution comprising an acid and metal solution.

14. The method according to claim 1, further comprising:
    monitoring conductivity of the metal salts in the simulated moving bed; and
    adjusting the production of the at least first product stream so that the first product stream exhibits a minimum conductivity.

15. The method according to claim 14, wherein monitoring the conductivity of the metal salts in the simulated moving bed comprises monitoring a recirculation stream in the simulated moving bed.

16. The method according to claim 14, wherein adjusting the production of the at least first product stream comprises adjusting a flow rate of a recirculation stream in the simulated moving bed.

17. A method for recovering acid and/or metals from an acid and metal salt solution, the method comprising:
    providing a simulated moving bed system for chromatographically separating different components, the simulated moving bed system comprising:
        at least one bed having a resin, the at least one bed comprising multiple separating sections with inlets and outlets connected in a loop so that a circulating liquid moves in sequence through the separating sections while a feed solution input stream and an aqueous eluent input stream are cyclically introduced in corresponding sequence to the loop at selected locations associated with the separating sections, and compensating product output streams are withdrawn in similarly corresponding sequence from the loop at other selected locations associated with the separating sections, all while maintaining a forward flow in a fixed direction through the loop during a plurality of steps, each of the steps commencing with the shifting of the input and output streams downstream in the loop;
    feeding the feed solution input stream to the simulated moving bed, wherein the feed solution input stream comprises an acid and a metal salt;
    feeding the aqueous eluent input stream to the simulated moving bed; and
    removing at least a first product output stream and a second product output stream from the simulated moving bed, wherein the first product output stream comprises a higher concentration of the acid than the second product output stream.

18. The method according to claim 17, wherein the feed solution input stream comprises one or more acids selected from the group consisting of sulfuric acid, hydrochloric acid, nitric acid, acetic acid and phosphoric acid.

19. The method according to claim 17, wherein said simulated moving bed (SMB) is selected from the group consisting of continuous SMB, semi-continuous SMB, time variable SMB, sequential SMB, and pulsed SMB.

20. The method according to claim 17, wherein feeding the aqueous eluent input stream to the simulated moving bed comprises continuously circulating the aqueous eluent input stream through the simulated moving bed.

21. The method according to claim 20, wherein the aqueous eluent comprises less than 5% dissolved components.

22. The method according to claim 17, further comprising filtering the feed solution input stream prior to feeding the feed solution input stream to the simulated moving bed.

23. The method according to claim 17, wherein the resin comprises an anion resin.

24. The method according to claim 23, wherein the anion resin is a weak base anion resin.

25. The method according to claim 23, wherein the anion resin is a strong base anion resin.

26. The method according to claim 24, wherein the anion resin is a type I anion resin.

27. The method according to claim 25, wherein the anion resin is a type II anion resin.

28. The method according to claim 17, comprising further processing at least one of the product output streams in a separate system, wherein the processing comprises one or more processes selected from the group consisting of chromatography, filtration, membrane treatment, evaporation, distillation, drying, gas absorption, solvent extraction, press extraction, adsorption, ion exchange and centrifugation.

29. The method according to claim 17, further comprising recycling at least one of the at least a first product output stream and a second product output stream for re-use in a process producing the feed solution input stream.

30. The method according to claim 17, further comprising:
    monitoring conductivity of the metal salts in the simulated moving bed; and
    adjusting the production of the at least first product output stream so that the first product output stream exhibits a minimum conductivity.

31. The method according to claim 30, wherein monitoring the conductivity of the metal salts in the simulated moving bed comprises monitoring the recirculation stream in the simulated moving bed.

32. The method according to claim 30, wherein adjusting the production of the at least first product output stream comprises adjusting a flow rate of a recirculation stream in the simulated moving bed.

* * * * *